United States Patent

Whitcomb

[11] Patent Number: 5,557,886
[45] Date of Patent: Sep. 24, 1996

[54] PLANT GROWING CONTAINER FOR AIR-PRUNING ROOTS

[76] Inventor: Carl E. Whitcomb, Rte. 5, Box 174, Stillwater, Okla. 74074

[21] Appl. No.: 530,606

[22] Filed: Sep. 20, 1995

[51] Int. Cl.$^6$ .................................................. A01G 23/02
[52] U.S. Cl. ........................................................ 47/73
[58] Field of Search ............................................. 47/73 R

[56] References Cited

U.S. PATENT DOCUMENTS

| | | | |
|---|---|---|---|
| 4,213,274 | 7/1980 | Skaife | 47/73 R |
| 4,442,628 | 4/1984 | Whitcomb | 47/66 |
| 4,497,132 | 2/1985 | Whitcomb | 47/66 |
| 4,510,712 | 4/1985 | Whitcomb | 47/66 |
| 4,574,522 | 3/1986 | Reiger et al. | 47/78 |
| 4,716,680 | 1/1988 | Whitcomb et al. | 47/73 |
| 4,753,037 | 6/1988 | Whitcomb | 47/73 |
| 4,939,865 | 7/1990 | Whitcomb et al. | 47/77 |
| 5,241,784 | 9/1993 | Henry | 47/73 R |
| 5,339,566 | 8/1994 | Cormier | 47/73 R |

*Primary Examiner*—Henry E. Raduazo
*Attorney, Agent, or Firm*—Bill D. McCarthy; Phillip L. Free, Jr.

[57] ABSTRACT

An improved container for growing a plant intended to be transplanted is provided. In one embodiment, the sidewall of the container includes an outer sidewall portion and at least one inset sidewall portion. The outer sidewall portion has a plurality of upwardly facing internal ledges positioned in spaced relationship one above the other. Each internal ledge serves to direct laterally growing roots to grow along the internal ledges. The inset sidewall portions of the sidewall are connected to and displaced inwardly from the outer sidewall portion, defining a plurality of root-pruning openings between the inset sidewall portion and the outer sidewall portion. Each root-pruning opening is aligned with an internal ledge so that roots growing along the internal ledges are directed to the root-pruning openings for air-root pruning. In an alternative embodiment, the sidewall of the container comprises a plurality of connected, rectangular sidewall sections disposed one above the other. Each rectangular sidewall section is greater in one dimension than the rectangular sidewall section below it, forming overhangs which are disposed opposite one another. The sidewall further comprises, a plurality of upwardly facing internal ledges connected between successive rectangular sidewall sections. Each internal ledge is disposed in an overhang and defines a plurality of root-pruning openings near the corners of the rectangular sidewall sections so that roots growing laterally in the container grow along the internal ledges and are directed to the root-pruning openings for air-pruning.

18 Claims, 3 Drawing Sheets

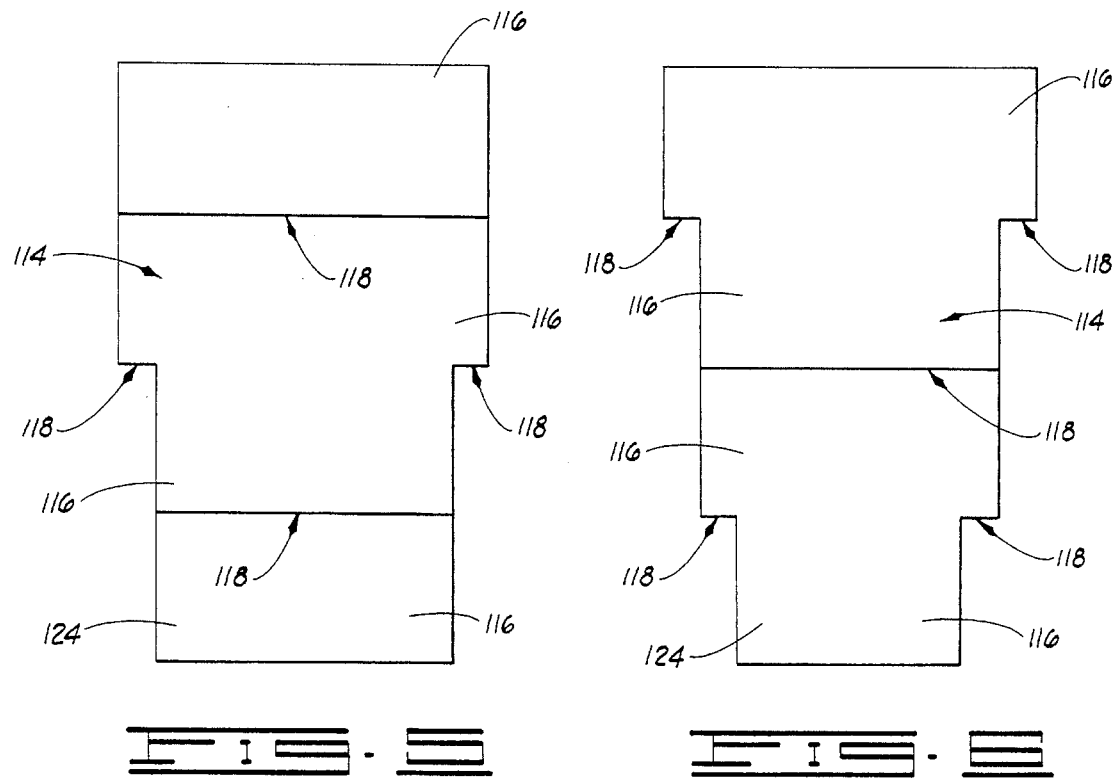
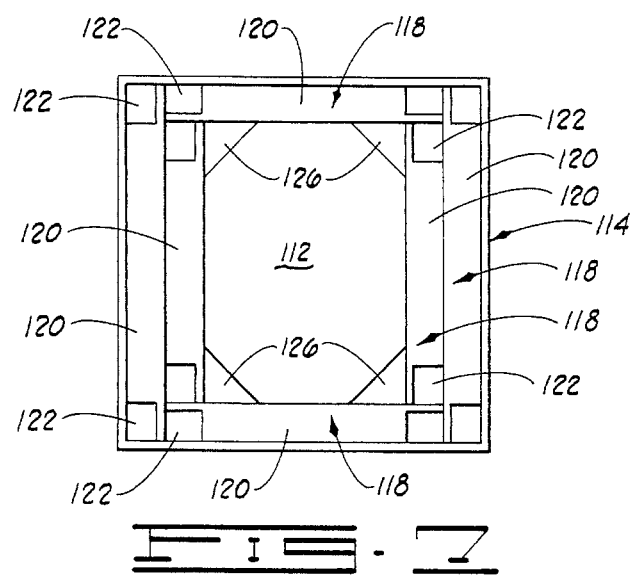

5,557,886

PLANT GROWING CONTAINER FOR AIR-PRUNING ROOTS

BACKGROUND OF THE INVENTION

1. Field of the Invention

This invention relates to an improved container for growing plants. More specifically, but not by way of limitation, the invention relates to an apparatus for root-pruning plants grown in containers.

2. Discussion

Today, nurseries typically grow landscape plants and other plants intended to be transplanted outdoors in containers above ground. Such container-grown plants can be grown at a faster rate than those grown in the field, and are easier to handle and display. In addition, because the roots of container-grown plants are not severed or otherwise disturbed when the plants are transplanted, transplanting can occur at any time during the year, not just during the early spring as required with bare root or bagged nursery stock.

When a germinating seed grows in a common container, typically a tap root forms first and quickly grows to the bottom of the container where it changes direction and continues to grow. If the root somehow becomes physically trapped or exits the container and is air-pruned, the tap root growth is terminated, and as a result, the apical dominance of the root tip is lost and the development of secondary lateral roots along the length of the tap root occurs. The lateral roots generally grow outwardly towards the sides of the container and slightly downwardly due to geotropism. When the lateral roots contact the sides of a round container, they circle the sides toward the bottom of the container where they continue growing in a circular pattern, sometimes for four or five more revolutions.

When a plant having root development of the type described above is transplanted, the "spiral" root development and generally downward orientation of the roots provides little or no lateral anchorage for the plant, and the root tips are at a depth in the soil where aeration is less favorable. In addition, the downwardly oriented roots are intermingled with each other and as such roots increase in diameter with age, they exert pressure on one another which restricts the normal flow of water and nutrients from the root tips to the top of the plant as well as the downward flow of energy from the leaves.

It has been shown that the root growth of container-grown plants after being transplanted primarily involves extensions of roots which were present in the container at the time of transplanting as opposed to the development of new roots. Consequently, the number and the position of root tips present at the time of transplanting is important to the rapid establishment, and frequently, the survival of container-grown plants. Thus, it is desirable for the plant to have roots poised to grow in all directions once it is planted in the landscape. This increases the rate of water and nutrient absorption plus provides secure root anchorage to keep the plant upright.

To address these concerns, landscape plants have been grown in bottomless containers placed on wire surfaces whereby roots reaching the bottom of the container are air-pruned. The air-pruning causes the root to branch, much like cutting off the tip of a twig or branch on the above-ground portion of a tree or shrub. However, plants grown in bottomless containers still end up with most of the root tips produced at the bottom of the container, and the requirement of placing the containers on wire screen surfaces generally makes the practice uneconomical. Further, such open bottom containers are not easily moved without spilling or losing some of the growth medium from the container.

More recently, containers have been developed for controlling spiral root growth whereby the root tips are physically trapped by surfaces in the container and are prevented from elongating, or the circling root tips are caused to pass through openings in the sides of the container whereby the roots are air-pruned. An example of the root trapping type of container is described in U.S. Pat. No. 4,442,628 issued Apr. 17, 1984. An example of a container including vertical side openings for air-pruning circling roots is described in U.S. Pat. No. 4,497,132 issued Feb. 5, 1985. While such root trapping and air-root pruning containers have been utilized successfully, some spiral root growth still takes place and the development of lateral root tips has been less than optimum.

U.S. Pat. No. 4,753,037 recently disclosed a container which has proven very effective in directing roots of plants into openings throughout the side wall and bottom of the container to facilitate air-pruning. However, the slopes and angles of the container has made the making of molds and manufacture of containers of this design difficult and costly.

Thus a need exists for an improved container for growing plants intended to be transplanted which minimizes root circling and promotes root branching in a manner which is cost effective and easy to manufacture.

SUMMARY OF THE INVENTION

An improved container for growing a plant intended to be transplanted is provided. The container is comprised of a bottom wall and an upwardly extending sidewall connected to the perimeter of the bottom wall, forming a container having an open top. The upwardly extending sidewall has internal and external surfaces and includes an outer, first sidewall portion having a plurality of upwardly facing primary internal ledges positioned in spaced relationship, one above the other, and an inset, second sidewall portion connected to and displaced inwardly from the outer, first sidewall portion. Each primary internal ledge serves to direct laterally growing roots to grow along the primary internal ledge. The inset, second sidewall portion defines a plurality of root-pruning openings between the inset, second sidewall portion and the outer, first sidewall portion. Each root-pruning opening is aligned with a primary internal ledge so that roots growing along the primary ledges are directed to the root-pruning openings for air-root pruning.

In an alternative embodiment, the present invention includes a bottom wall and an upwardly extending sidewall connected to the perimeter of said bottom wall forming a container having an open top. The upwardly extending sidewall comprises a plurality of connected, rectangular sidewall sections disposed one above the other, wherein each rectangular sidewall section is greater in one dimension than the rectangular sidewall section below it, forming overhangs which are disposed opposite one another; and a plurality of upwardly facing internal ledges connected between successive rectangular sidewall sections, each internal ledge disposed in an overhang and defining a plurality of root-pruning openings near the corners of the rectangular sidewall sections so that roots growing laterally in the container grow along the internal ledges and are directed to the root-pruning openings for air-pruning.

It is, therefore, an object of the present invention to provide an improved plant growing container.

Another object of the present invention, while accomplishing the above object, is to provide an improved plant growing container which minimizes root circling and promotes root branching.

A further object of the present invention, while accomplishing the above objects, is to provide an improved plant growing container which is cost effective and easy to manufacture.

Other objects, advantages and features of the present invention will become apparent from a reading of the following description taken in conjunction with the accompanying drawing and appended claims.

BRIEF DESCRIPTION OF THE DRAWINGS

FIG. 5 is a side elevational view of the container of FIG. 4.

FIG. 6 is another side elevational view of the container of FIGS. 4 and 5.

FIG. 7 is a top plan view of the container of FIGS. 4, 5 and 6.

DESCRIPTION

Figure 1:
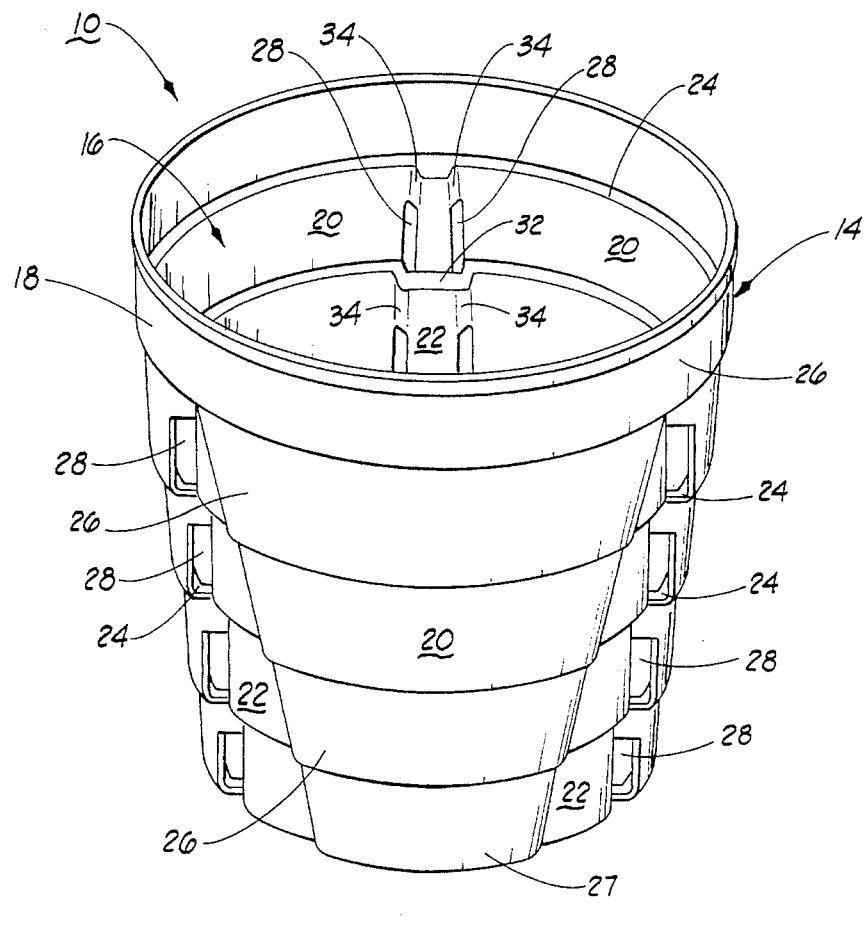
FIG. 1 is a perspective view of a plant growing container of the present invention.
Figure 2:
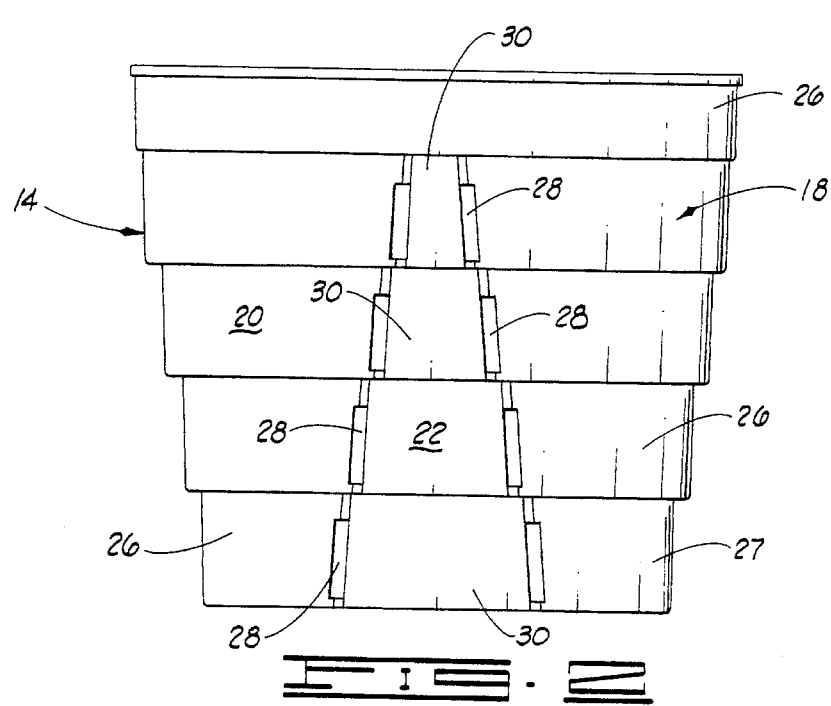
FIG. 2 is a side elevational view of the container of FIG. 1.
Figure 3:
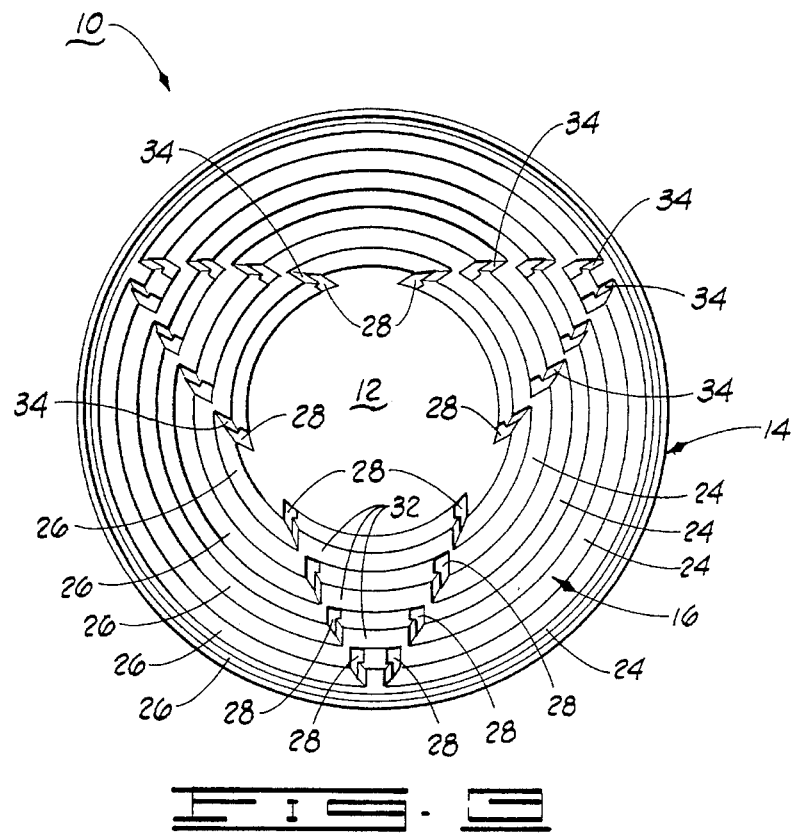
FIG. 3 is a top plan view of the container of FIGS. 1 and 2.
Figure 4:
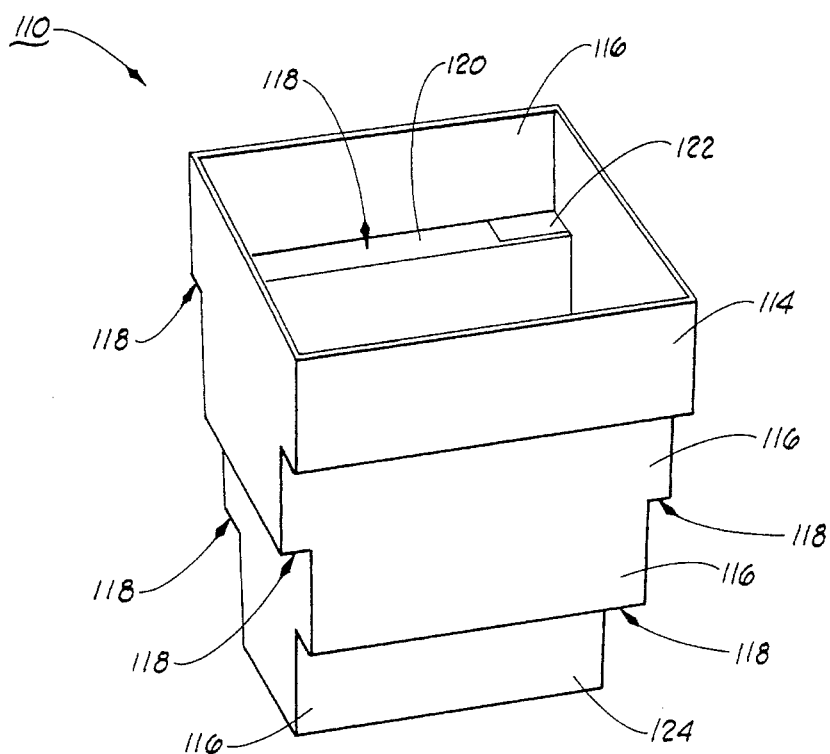
FIG. 4 is a perspective view of an alternative embodiment of a plant growing container of the present invention.

Referring now to the drawings, and particularly to FIGS. 1–3, one embodiment of a plant growing container of the present invention is illustrated and generally designated by the numeral 10. The container 10 is comprised of a bottom wall 12 and an upwardly extending sidewall 14. The sidewall 14 is connected to the perimeter of the bottom wall 12, which together form the container 10 having an open top. The sidewall 14 has an internal surface 16 and an external surface 18.

As illustrated in FIGS. 1–3, the sidewall 14 includes an outer, first sidewall portion 20 and at least one inset, second sidewall portion 22 connected to and displaced inwardly from the outer, first sidewall portion 20. The outer, first sidewall portion 20 has a plurality of upwardly facing primary internal ledges 24 positioned in spaced relationship one above the other on the internal surface 16. Preferably, the outer, first sidewall portion 20 includes a plurality of increasingly smaller annular sections 26, with the bottom of each annular section 26 connected to the top of the next smaller annular section 26 below it by one of the primary internal ledges 24. Thus, each annular section 26 is inset from the annular section 26 above it by the width of the primary internal leges 24 connecting them. Of course, the bottom annular section 27 is connected to the perimeter of the bottom wall 12. As illustrated in FIGS. 1–3, the outer, first sidewall portion 20 is of a generally circular cross section. While such a container shape is presently preferred, other container shapes can be utilized, such as a square cross section.

When roots growing laterally in the container 10 reach the outer, first sidewall portion 20 of the container 10, the lateral roots circle the outer side wall portion 20 downwardly, toward the bottom wall 12, until the roots encounter one of the primary internal ledges 24 which direct the laterally growing roots to grow along the primary internal ledges 24.

The inset, second sidewall portion 22 is connected to the outer, first sidewall portion 20, defining a plurality of substantially vertical root-pruning openings 28 between the inset, second sidewall portion 22 and the outer, first sidewall portion 20. Each root-pruning opening 28 is aligned with a primary internal ledge 24 so that roots growing along the primary internal ledges 24 are directed to a root-pruning opening 28 for air-root pruning, i.e., the portion of the root extending through the root-pruning openings 28 and into the air is killed by desiccation. Likewise, root-pruning openings 28 are aligned with the perimeter of the bottom wall 12 of the container 10, so that roots growing in a circular pattern along the perimeter of the bottom wall 12 of the container 10 are directed to a root-pruning opening 28 for air root-pruning.

Preferably, the inset, second sidewall portion includes a plurality of increasingly larger, trapezoid-like segments 30. Each trapezoid-like segment 30 is connected to the larger trapezoid-like segment 30 below it by a secondary internal ledge 32, with the bottom trapezoid-like segment connected to the bottom wall 12 of the container 10. The inset, second sidewall portion 22 also includes a plurality of connecting tabs 34. A pair of connecting tabs 34 connects each of the trapezoid-like segments 30 to the outer, first sidewall portion 20. The net effect of the plurality of increasingly larger, trapezoid-like segments is an inset, second sidewall portion which is substantially triangular in shape.

Lateral roots which contact the inset, second sidewall portion 22 will grow along the secondary internal ledges 32. Each secondary internal ledge 32 is contiguous with a primary internal ledge 24, forming a ledge system that encircles the entire internal surface 16 of the sidewall 14 and provides a means for lessening or preventing the downward orientation of the root tips.

FIGS. 1–3 depict a container 10 according to the present invention having three inset, second sidewall portions 22 evenly distributed around the internal surface 16 of the container 10. However, it should be recognized that the number of inset, second sidewall portions 22 should be adjusted according to the size of the container to yield optimum root-pruning. Thus, more inset, second sidewall portions 22 would be used for larger containers, and fewer would be used for smaller containers.

The container 10 of the present invention can be constructed of any suitable material, such as plastic. The slopes and angles of the container 10 constructed in accordance with the present invention can be rounded sufficiently to allow construction via blow-molding, vacuum-forming, or other thermoforming processes, without sacrificing the root modifying qualities of the container 10. When constructed in this manner, the root-pruning openings 28 are cut out as a secondary process. When the container 10 is constructed by injection-molding, the secondary, cutting process is unnecessary, as the root-pruning openings 28 are formed during the injection-molding process.

In using the container 10 of the present invention, a growth medium is placed in the container 10, and a seed or seedling is planted in the growth medium. The tap root formed by the plant in the growth medium rapidly extends to the bottom wall 12 of the container 10. Upon contact with the bottom wall 12, the tap root grows outward, toward the sidewall 14 of the container 10. When the tap root reaches the sidewall 14, it follows the sidewall 14 which directs it to one of the root-pruning openings 28. Upon extending through a root-pruning opening 28, the tap root is air-pruned, i.e., the portion of the root extending into the air is killed by desiccation.

When the tap root is thus terminated, secondary lateral roots are developed along the length of the tap root within the container 10 and growth medium. The secondary lateral roots grow outwardly from the tap root until they contact either the outer, first sidewall portion 20 or the inset, second sidewall portion of the sidewall 14. The secondary lateral roots are guided downwardly into contact with either a primary internal ledge 24 or a secondary internal ledge 32, which together make up the ledge system. The secondary lateral roots follow the ledge system horizontally until they are directed to a root-pruning opening 28 by a primary internal ledge 24. As the root tips extend through the root-pruning openings 28 they are air-pruned, causing root branching from the secondary lateral roots which results in additional lateral root development.

The ledge system directs this additional lateral root growth to the root-pruning openings 28 for air root-pruning at all levels along the side wall 14 of the container 10, promoting root branching from the lateral roots thereby maximizing lateral root tip production. Upon transplantation, root tips are present at all levels in the growth medium, and new roots grow in all directions around the plant, quickly anchoring the plant and providing rapid absorption of water and nutrients.

Turning now to FIGS. 4–7, an alternative embodiment of a plant growing container of the present invention is illustrated and generally designated by the numeral 110. The container 110 is comprised of a bottom wall 112 and an upwardly extending sidewall 114. The sidewall 114 is connected to the perimeter of the bottom wall 112, which together form the container 110 having an open top.

As illustrated in FIGS. 4–7, the sidewall 114 is comprised of a plurality of rectangular sidewall sections 116. Successive rectangular sidewall sections 116 are connected along two corresponding, opposing sides, making each rectangular sidewall section 116 substantially equal in one dimension, i.e., either length or width, to the rectangular sidewall section 116 below it. Each rectangular sidewall section 116 is greater in one dimension than the corresponding dimension on the rectangular sidewall section 116 below it, forming rectangular overhangs 118 which are disposed opposite one another. Desirably, the width of each of the opposing overhangs 118 is one-half the difference in dimension between the successive rectangular sidewall sections 116. The direction of successive overhangs preferably alternates, forming a sequence of perpendicular rectangular sidewall portions which decrease in size from the top to the bottom of the container 110.

The sidewall 114 also includes a plurality of upwardly facing internal ledges 120 which are disposed horizontally within the rectangular overhangs 118. The internal ledges 120 connect the successive rectangular sidewall section 116 along the other two corresponding, opposing sides. The internal ledges 120 are centered within the rectangular overhangs 118, forming rectangular root-pruning openings 122 at either end of each rectangular overhang 118. Thus, rectangular root-pruning openings 122 are defined at the corners of each rectangular sidewall section 116.

The bottom rectangular sidewall section 124 is connected to the perimeter of the bottom wall 112. Triangular or square root-pruning openings 126 are formed in the bottom wall 112 at the four corners of the bottom rectangular sidewall section 124.

The container 110 of the present invention can be constructed of any suitable material, such as plastic. The slopes and angles of the container 110 constructed in accordance with the present invention can be rounded sufficiently to allow construction via blow-molding, vacuum-forming, or other thermoforming processes, without sacrificing the root modifying qualities of the container 110. When constructed in this manner, the root-pruning openings 122, 126 are cut out as a secondary process. When the container 110 is constructed by injection-molding, the secondary, cutting process is unnecessary, as the root-pruning openings 122, 126 are formed during the injection-molding process.

In using the container 110 of the present invention, a growth medium is placed in the container 110, and a seek or seedling is planted in the growth medium. The tap root formed by the plant in the growth medium rapidly extends to the bottom wall 112 of the container 110. Upon contact with the bottom wall 112, the tap root grows outward, toward the sidewall 114 of the container 110. When the tap root reaches the sidewall 114, it follows the bottom rectangular sidewall section 124 which directs it to one of the triangular root-pruning openings 126. Upon extending through a triangular root-pruning opening 126, the tap root is air-pruned, i.e., the portion of the root extending into the air is killed by desiccation.

When the tap root is thus terminated, secondary lateral roots are developed along the length of the tap root within the container 110 and growth medium. The secondary lateral roots grow outwardly from the tap root until they contact the sidewall 114. The secondary lateral roots follow the contour of the sidewall 114 and the rectangular sidewall sections 116, the ninety degree corners formed thereby and the internal ledges 120 serve to guide the roots into the root-pruning openings 122, 126. As the root tips extend through the root-pruning openings 122, 126 they are air-pruned, causing root branching from the secondary lateral roots which results in additional lateral root development.

The container 110 of the present invention directs lateral root growth to the root-pruning openings 122, 126 for air root-pruning at all levels along the sidewall 114 of the container 110, promoting root branching from the lateral roots thereby maximizing lateral root tip production. Upon transplantation, root tips are present at all levels in the growth medium, and new roots grow in all directions around the plant, quickly anchoring the plant and providing rapid absorption of water and nutrients.

It will be clear that the present invention is well adapted to carry out the objects and attain the advantages mentioned as well as those inherent therein. While presently preferred embodiments of the invention have been described for purposes of this disclosure, numerous changes can be made which will readily suggest themselves to those skilled in the art and which are encompassed within the spirit of the invention disclosed and as defined in the appended claims.

What is claimed is:

1. An improved container for growing a plant intended to be transplanted, comprising:

a bottom wall; and an upwardly extending sidewall connected to the perimeter of the bottom wall forming a container having an open top, the upwardly extending sidewall having an internal surface and an external surface, the sidewall comprising:

an outer, first sidewall portion having a plurality of upwardly facing primary internal ledges positioned in spaced relationship one above the other, each primary internal ledge serving to direct laterally growing roots to grow along the primary internal ledge; and an inset, second sidewall portion connected to and displaced inwardly from the outer, first sidewall portion, the inset, second sidewall portion defining a plurality of root-pruning openings between the inset, second sidewall portion and the outer, first sidewall portion, each root-pruning opening aligned with a primary internal ledge so that roots growing along the primary internal ledges are directed to the root-pruning openings for air-root pruning.

2. The improved container of claim 1 wherein the inset, second sidewall portion is connected to the bottom wall of the container, defining at least one root-pruning opening between the outer, first sidewall portion; the inset, second sidewall portion; and the bottom wall of the container so that roots growing along the bottom wall of the container are directed to the root-pruning opening for air-root pruning.

3. The improved container of claim 2 wherein the outer, first sidewall portion further comprises a plurality of increasingly smaller annular sections, each annular section inset from the annular section above it and each annular section having a top and a bottom.

4. The improved container of claim 3 wherein the top of each annular section is connected to the bottom of the annular section above it by one of the upwardly facing internal ledges and wherein the annular section closest to the bottom wall of the container is connected thereto.

5. The improved container of claim 4 wherein the inset, second sidewall portion comprises a plurality of secondary internal ledges, each secondary internal ledge contiguous with a primary internal ledge forming a ledge system that encircles the entire internal surface of the upwardly extending sidewall.

6. The improved container of claim 5 wherein the root-pruning openings are substantially vertical.

7. The improved container of claim 6 wherein the inset, second sidewall portion further comprises a plurality of increasingly larger trapezoid-like segments, each trapezoid-like segment is inset from the trapezoid-like segment above it and each trapezoid-like segment having a top and a bottom.

8. The improved container of claim 7 wherein the top of each trapezoid-like segment is connected to the bottom of the trapezoid-like segment above it by one of the upwardly facing internal ledges and wherein the trapezoid-like segment closes to the bottom wall of the container is connected thereto.

9. The improved container of claim 8 wherein the inset, sidewall portion further comprises a plurality of connecting tabs, at least two connecting tabs connecting each of the trapezoid-like segments to the outer, first sidewall portion of the container.

10. The improved container of claim 9 wherein the inset, second sidewall portion is substantially triangular in shape.

11. The improved container of claim 10 wherein the outer, first sidewall portion has a generally circular cross-section.

12. An improved container for growing a plant intended to be transplanted, comprising:

a bottom wall; and an upwardly extending sidewall connected to the perimeter of said bottom wall forming a container having an open top, the upwardly extending sidewall comprising:

a plurality of connected, rectangular sidewall sections disposed one above the other, wherein each rectangular sidewall section is greater in one dimension than the rectangular sidewall section below it, forming overhangs which are disposed opposite one another; and a plurality of upwardly facing internal ledges connected between successive rectangular sidewall sections, each internal ledge disposed in an overhang and defining a plurality of root-pruning openings near the corners of the rectangular sidewall sections so that roots growing laterally in the container grow along the internal ledges and are directed to the root-pruning openings for air-pruning.

13. The improved container of claim 12 wherein the rectangular sidewall section closest to the bottom wall of the container is connected to the perimeter of the bottom wall.

14. The improved container of claim 13 wherein the bottom wall includes a plurality of root-pruning openings near the corners of the rectangular sidewall section attached to the bottom wall of the container so that roots circling the bottom wall of the container are directed to the root-pruning openings for air-pruning.

15. The improved container of claim 14 wherein the internal ledges are disposed horizontally in the overhangs and wherein the overhangs are rectangular.

16. The improved container of claim 15 wherein the internal ledges are centered with the rectangular overhangs, defining root-pruning openings near the corner of the rectangular overhangs.

17. The improved container of claim 16 wherein the width of each opposing overhang is one-half the difference in dimension between the successive rectangular sidewall sections forming the overhang.

18. The improved container of claim 17 wherein the direction of successive overhangs alternates.

* * * * *